United States Patent [19]

Orr et al.

[11] Patent Number: 4,964,220
[45] Date of Patent: Oct. 23, 1990

[54] COORDINATE MEASURING MACHINE WITH COVER SYSTEM

[75] Inventors: Ladd Orr, Ft. Meyers, Fla.; Freddie L. Raleigh, Centerville; Thomas L. Hemmelgarn, Dayton, both of Ohio

[73] Assignee: The Warner & Swasey Company, Cleveland, Ohio

[21] Appl. No.: 331,727

[22] Filed: Apr. 3, 1989

[51] Int. Cl.$^5$ .............................................. G01B 5/03
[52] U.S. Cl. ...................................... 33/503; 33/1 M
[58] Field of Search ................................ 33/1 M, 503

[56] References Cited

U.S. PATENT DOCUMENTS

| | | | |
|---|---|---|---|
| 3,509,635 | 7/1966 | Meinke | 33/503 |
| 4,175,327 | 11/1979 | Herzog | 33/1 M |
| 4,631,834 | 12/1986 | Hayashi | 33/503 |
| 4,680,868 | 7/1987 | Orr et al. | 33/503 |
| 4,682,418 | 7/1987 | Tuss et al. | 33/1 M |
| 4,741,112 | 5/1988 | Band et al. | 33/503 |
| 4,766,674 | 8/1988 | Zanier et al. | 33/503 |
| 4,805,314 | 2/1989 | Hayashi et al. | 33/503 |
| 4,882,847 | 11/1989 | Hemmelgarn et al. | 33/503 |

FOREIGN PATENT DOCUMENTS 8809478 12/1988 World Int. Prop. O. ............ 33/503

Primary Examiner—William A. Cuchlinski, Jr
Assistant Examiner—D. Price
Attorney, Agent, or Firm—John R. Benefiel; Raymond J. Eifler

[57] ABSTRACT

A coordinate measuring machine (10) having a horizontal probe shaft assembly (20) in which a cover system is provided for the X and Y axis ways (46, 108) and carriages (50, 106), including inwardly slanted X-axis cover members (26) mounted atop granite exposed way members (24) defining a gap through which the Y column (88) moves, a pair of upstanding side covers (32) mounted over the Y-axis column (88) defining a gap through which the probe shaft assembly (20) moves in its vertical movement. a recirculating cover belt (28) fills the X-axis gap and pleated upper and lower covers (34, 36) cover the vertical gap lying between the side covers (32) at the front and rear, while a top cap (38) atop side covers (32) and end caps (30) are fit over the X-axis cover members (26), X-axis way members (24) and base portion (18).

14 Claims, 5 Drawing Sheets

COORDINATE MEASURING MACHINE WITH COVER SYSTEM

This invention concerns coordinate measuring machines and more particularly such machines having a cover system for enclosing the bearing ways and other components to protect against dirt and minimize temperature shifts affecting measurement accuracy.

Coordinate measuring machines are now in widespread industrial use, and involve a probe shaft supported by a system of carriages and ways for precision movement along three orthogonal axes. This movement is measured by transducers to enable measurement of the distance traversed by the probe tip, and measurement dimensions of a workpiece can be carried out by traversing the probe shaft tip between the points on the workpiece defining the dimension of interest.

These machines are carefully designed and built to insure precision movement along each axis and to avoid nonrepeatable structural distortions which could disturb the correspondence between the measured movement as sensed by the transducers and the distance actually traversed by the probe tip.

For example, precision ways and air film bearings are used to minimize frictional resistance which would result in nonrepeatable random structural distortions. It is important to protect these components from dirt and damage, and to minimize thermal fluctuations caused by shifts in ambient conditions, often encountered in uncontrolled factory environments, and for this reason cover systems have been developed to enclose the machine components.

Such cover systems are the most visible part of the machine and therefor are an important aspect of the design appeal of the machine.

The cover system, while completely enclosing the sensitive components and allowing substantially free movement of the carriages, should be readily removable to enable access thereto for maintainence purposes without extensive disassembly labor.

In U.S. Pat. No. 4,468,868 issued on July 21, 1987 for a Coordinate Measuring Machine With Covers, there is disclosed various cover systems which accomplish the above purpose in the context of vertical probe coordinate measuring machines for a particular carriage-way bearing arrangement.

Horizontal arm coordinate measuring machines are also known, in which the probe shaft is mounted for horizontal in and out movement (Z-axis movement) on a carriage which moves vertically (Y-axis movement) on ways extending up and down on a vertical column. The column is in turn supported on a carriage supported for horizontal (X-axis) movement on ways fixed to the base of the machine extending in a direction orthogonal to the probe shaft movement.

The present invention provides a cover system particularly adapted to another carriage-way bearing configuration and for a horizontal arm coordinate measuring machine.

SUMMARY OF THE INVENTION

The present invention provides a cover system for the Xaxis carriage and ways, in which the ways comprise inwardly inclined opposing granite members. The granite way members are kept exposed, and an inwardly slanting cover is attached to the top of each way member, continuing the inclined angle of the associated way member. Each X-axis cover member includes an inwardly extending top flange together with the top flange of the opposite X-axis cover member defining a gap extending along the X-axis through which the X-axis carriage moves. A recirculating belt curtain covers the gap and is attached at either side of the X-axis carriage and extends about roller sets at either end of the machine and beneath the machine. End piece covers are fit to either end of the machine over the Xaxis cover pieces and roller sets, secured with Velcro (TM) fasteners to enable a quick disassembly from the machine.

The Y-axis column is provided with a cover system comprised of a pair of side cover pieces attached to the column and defining a vertically extending gap at the front and rear to accommodate the vertical movement of the Y-axis carriage. Expandable pleated curtains are fit above and below the carriage and attached with Velcro (TM) fasteners to be readily removable for access to the covered components. The side cover pieces are supported on a two piece platform fixed to the bottom of the column and attached to channels extending along either side of the front and rear pleated curtains, the channels secured to the platform and a bracket affixed to the top of the column. A top cover piece is fit over the top of the side pieces.

The probe shaft has a rigid cover fit over the rear and an expandible bellows over the front end, accommodating the in and out movement of the probe shaft.

The cover system has the advantage of completely enclosing and shielding the precision components while accommodating the movement of the carriage, and imparting a clean, attractive overall appearance to the machine.

DETAILED DESCRIPTION

FIG. 1 depicts a coordinate measuring machine 10 of the so called horizontal arm type, which also includes a rotary table 12 on which a workpiece W to be measured may be placed.

Figure 1:
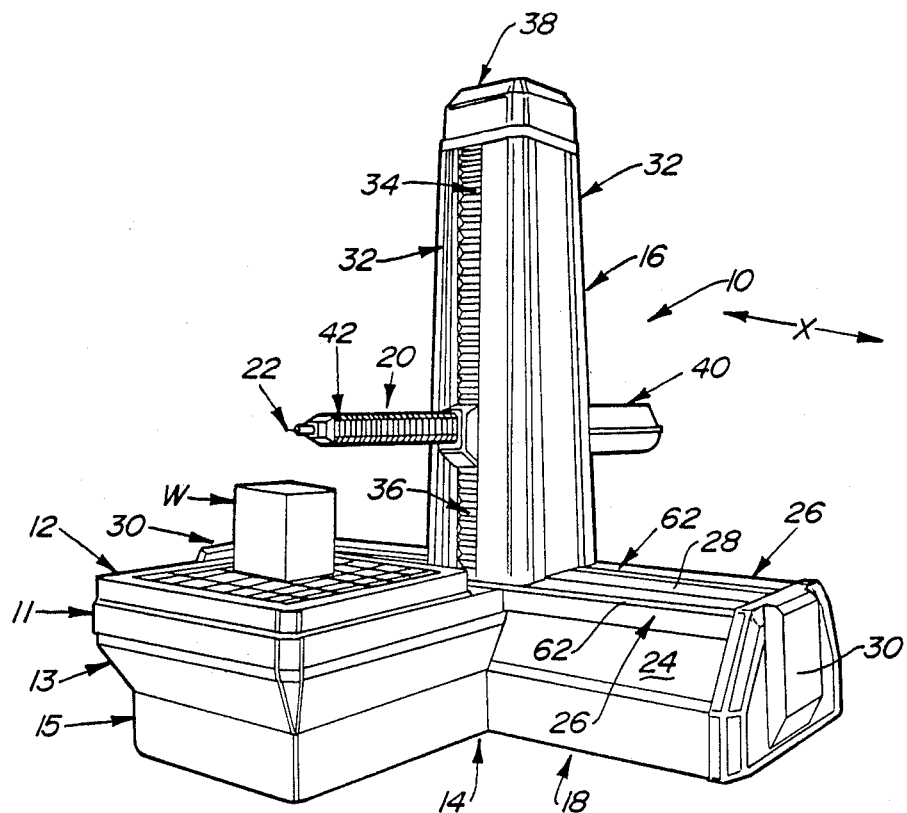
FIG. 1 is a perspective view of a horizontal arm corrdinate measuring machine incorporating a cover system according to the present invention.

A tee shaped base 14 supports the table 12 as well as a column assembly 16, which is movable in a horizontal plane along the length of base section 18, in a direction referred to as the X-axis as indicated.

The base 14 includes a table base portion 15, with a spacer block 13 fixed a stacked atop the portion 15. A table cover 11 surrounds the table 12 and protects the various operating components located beneath the table 12.

The column assembly 16 supports a probe shaft assembly 20 which extends in a second horizontal direction.

Probe shaft assembly 20 is supported for vertical movement on the Y-axis column 16 (Y-axis movement) as well as in and out movement (Z-axis movement).

Thus, the probe tip 22 may be traversed along three orthogonal axes, X, Y, and Z to measure points on a workpiece W.

The Y column is supported for movement along the X-axis on a pair of granite X-axis way members 24 fixed atop the base section 18 extending along the X-axis, and according to one feature of the invention, the granite way members 24 and base section 18 are exposed to view.

The cover system for the X-axis includes a pair of elongated side cover members 26 each affixed spaced apart atop a respective way member 24, with a recirculating cover belt 28 extending across the gap and moving with the Y-column assembly 16 to keep the gap covered at all times.

A pair of end piece covers 30 are fit over the ends of the base section 18, way members 24, and cover members 26 to complete the X-axis cover system.

The Y-axis cover system comprises a pair of Y-axis cover pieces 32 spaced apart with a gap at the front and rear accommodating vertical Z-axis movement of the probe shaft assembly 20. This gap is covered by upper and lower pleated curtains 34, 36, and both the front (shown) and rear (not shown in FIG. 1) are releasably attached at one end to the probe shaft assembly 20. A top cap piece 38 covers the end of the Y column assembly 16.

The probe shaft assembly 20 also includes a cover system comprising a rigid cover 40 attached to the rear and an expandable bellow cover 42 attached to the front.

Figure 2:
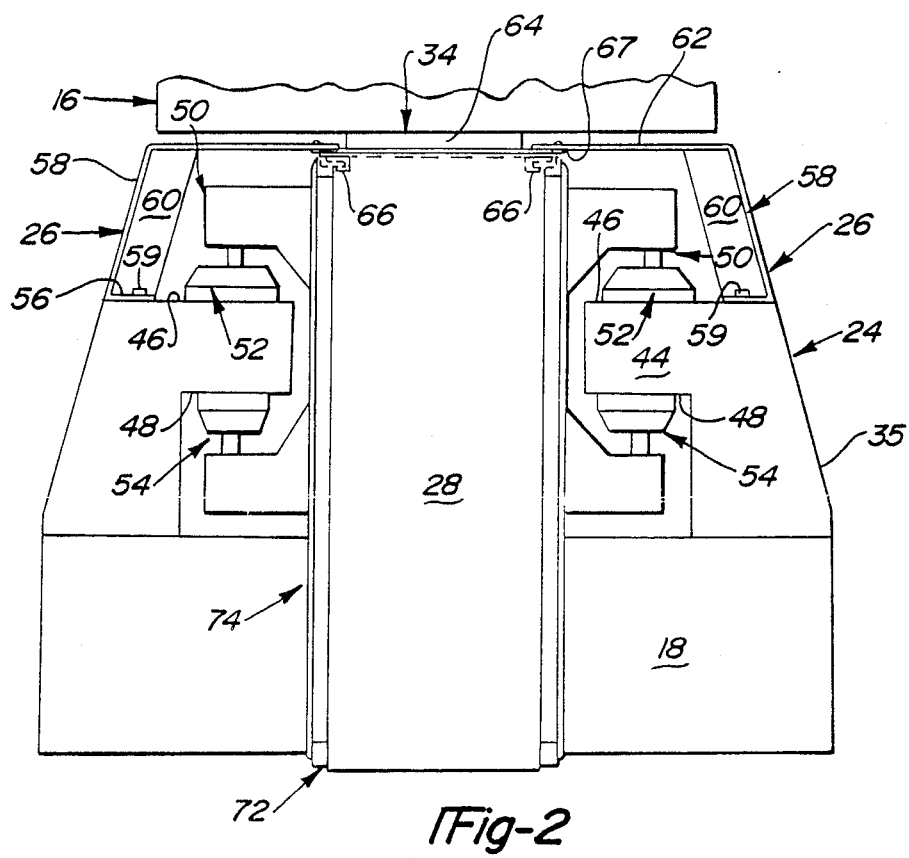
FIG. 2 is an end view of the base and X-axis ways of the machine shown in FIG. 1, with the cover system installed but with the end cover piece removed.

FIG. 2 shows that the outside contour 35 of each of the way members 24 slope inwardly towards each other. Each of the way members 24 have an inwardly extending lip portion 44 defining upper and lower way surfaces 46, 48 extending along the X-axis and providing support for the X-axis carriage 50 on which the Y column assembly 16 is supported. Air bearings 52, 54 are employed to support the carriage 50 and Y axis column 16 for movement along the X axis.

The X-axis side cover members 26 are fixed atop the way members 24 by inside lower flanges 56 and cap screws 59 received in the upper way surface 46. The connection should preferably be achieved by a slotted openings at one end to insure that differences in thermal expansion will not exert stresses on the way members 24. The outside panel 58 of each cover member 26 is inclined at the same angle as the outside contours 35 of the way members 24, and are flush therewith to continue the inclination and provide a continuous shape for aesthetic effect as well as to reduce the obtrusiveness of these contours.

A plurality of stiffener webs 60 extend inwardly from the panels 58 welded to the bottom flanges 56 and also to upper cover flanges 62 extending inwardly towards each other with a gap therebetween occupied by the belt cover 28 and which accommodates the connection 64 between the Y-column assembly and the X-axis carriage 50.

The cover belt 28 rides on plastic pieces 66 attached to stiffener channels 67 along the inside edges of flanges 62.

Figure 3:
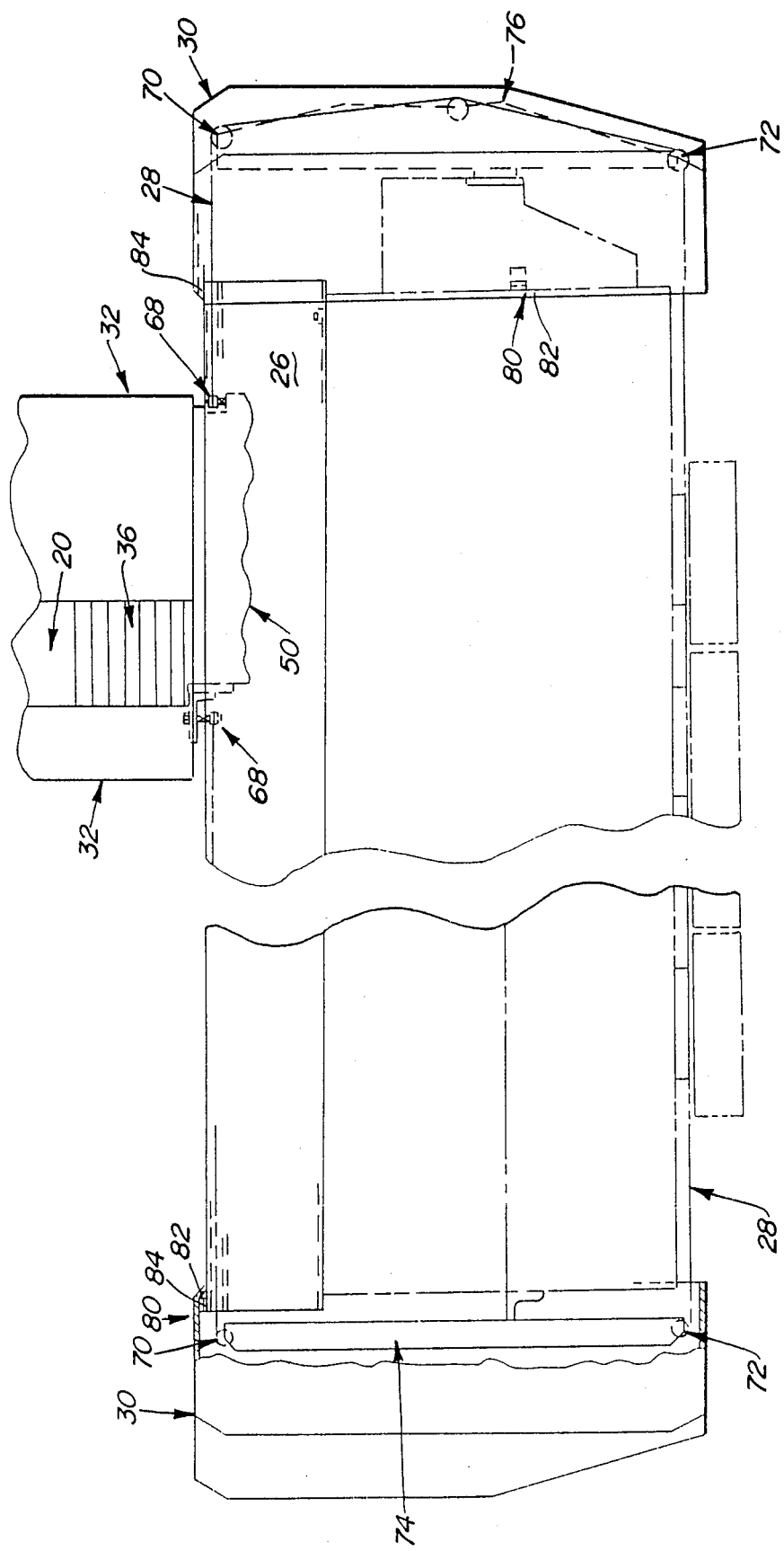
FIG. 3 is a front elevational view of the base and X-axis ways of the machine shown in FIG. 1.

FIG. 3 shows that the cover belt 28 comprises a single strip of flexible material, which is connected at either end to the carriage 50, by spring loaded clamping assemblies 68 located at the right and left of the carriage 50. The spring loaded clamping assemblies serve to maintain tensioning of the cover belt 28, and allow relative vertical movement of the cover belt 28 and carriage 50 due to misalignments in the cover channels 67 and way surfaces 46..

The cover belt 28 is recirculated beneath the base 18, passing around upper and lower rollers 70, 72 supported on brackets 74, 76 affixed to either end of the base 18. Thus, as the carriage moves back and forth along the X-axis, the cover belt 28 moves with it, all the while serving to cover the gap between X-axis cover members 26. The recirculation of the cover belt 28 also yields a self cleaning action, as dirt tends to be dumped from the surface thereof as the cover belt 28 passes around the rollers 70, 72.

The end cover pieces 30 are fit over the respective ends of the cover members 26 as shown, and are detachably retained with mating strips of Velcro (TM) material 80, 82 attached to the inside edge of each cover piece 30 and a bridging bar 84 joining the ends of the cover members 26.

Figure 4:
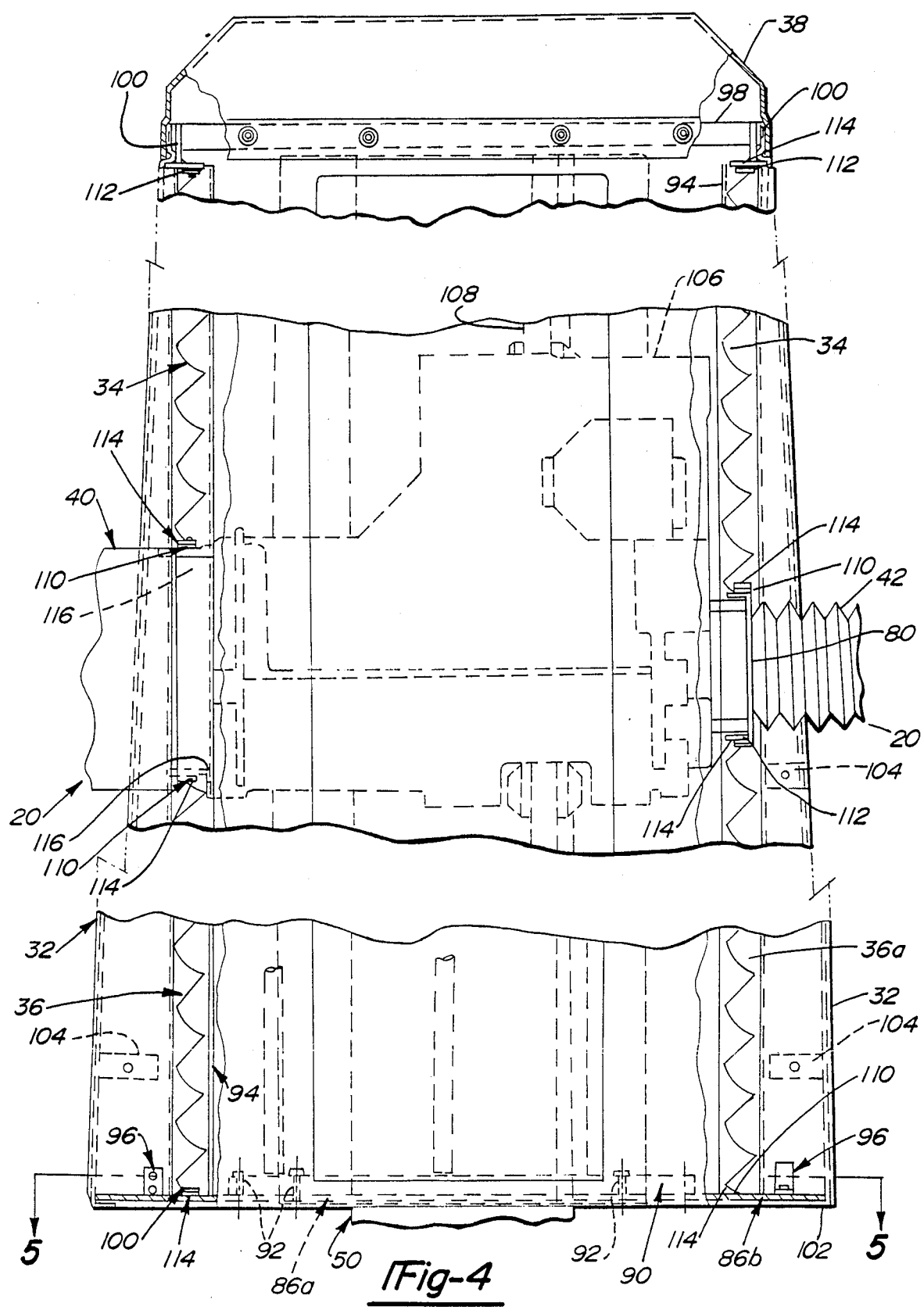
FIG. 4 is a side elevational view of the Y-axis column and probe shaft of the machine shown in FIG. 1, with the system installed thereon.

FIG. 4 illustrates further details of the major components of the cover system for the Y column assembly 16, which includes a two piece platform 86 comprised of plates 86a, 86b secured to the Y column structure 88 by bracket bars 90 and screws 92. The platform 86 supports two pairs of cover support channels 94 spaced apart on either side of the gap between the covers 32 receiving the probe shaft assembly 20.

The bottoms of the channels 94 are attached to the platform 86 with brackets 96 while the top of the channel 94 is attached to an encircling top weldment 98 fixed to the top of the Y column 88 with brackets 100.

The Y axis side covers 32 are in turn formed with a bottom lip 102 extending below the platform 86, and are mounted to the channels 94 with a series of blocks 104.

The side covers 32 taper in towards the top to continue the same design theme as in the inclined contours 58 of the Xaxis side covers 26.

The Y-axis side covers 32 are configured to completely enclose the Y column 88 as well as the Y axis carriage 106 supported on bearing ways 108. The Y-axis carriage 106 supports the probe shaft assembly 20 for movement along the vertical Y-axis direction.

The upper end of the top pleated curtains 34 and the upper end of bottom pleated curtain 36 are fastened at their tops by clamping strips 112 secured to bars 114, and at their bottoms with mating releasible Velcro (TM) strips 110 carried on support bars 114 attached to the curtains 36 and angles 116 attached to the Y carriage 106 and platform 86.

Velcro (TM) strips 110 are also used to attach the probe bellows cover 42 to the Y-axis carriage 106.

Figure 5:
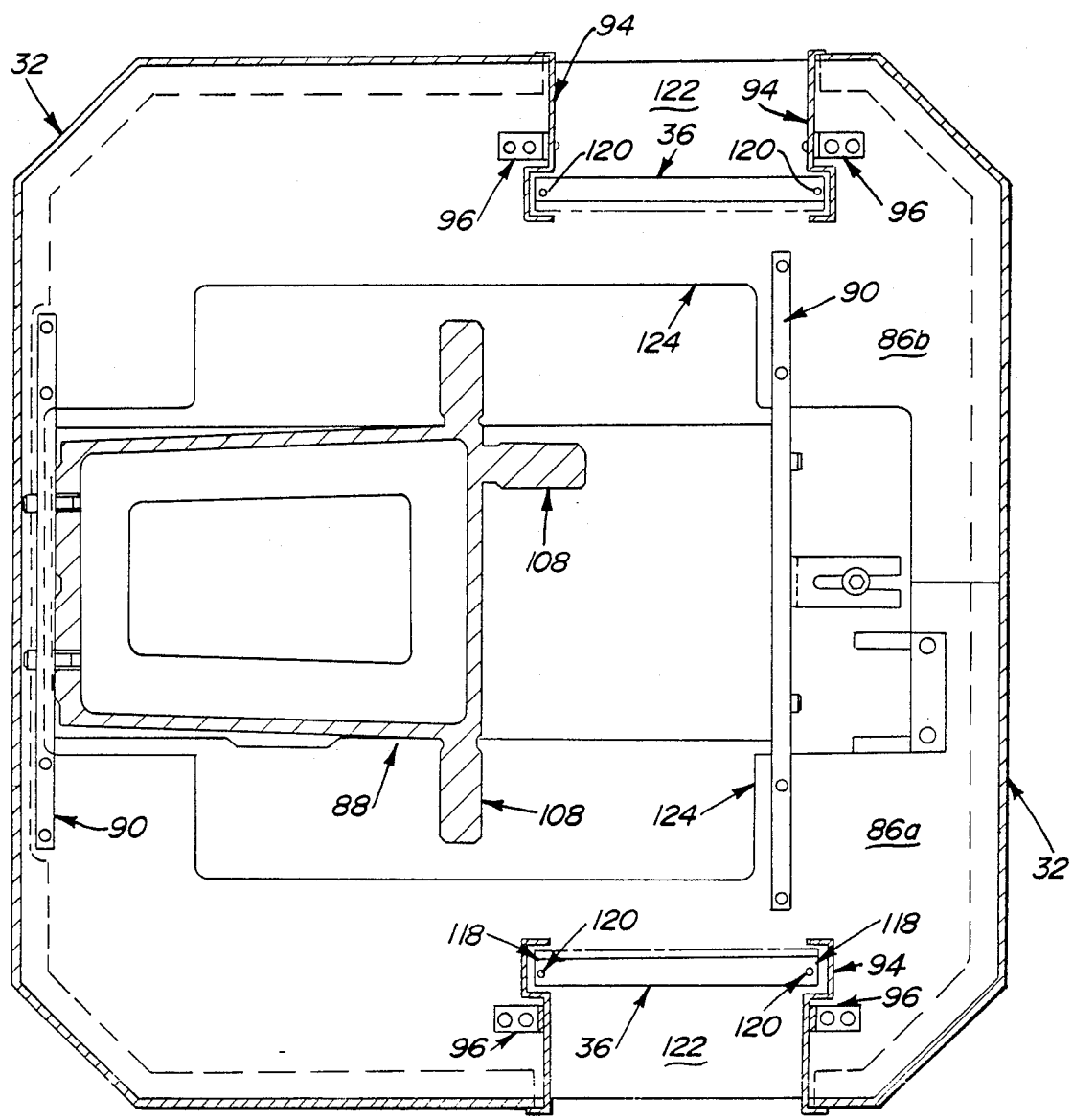
FIG. 5 is a view of the section 5—5 of FIG. 4 Rotated 90° counterclockwise.
Figure 6:
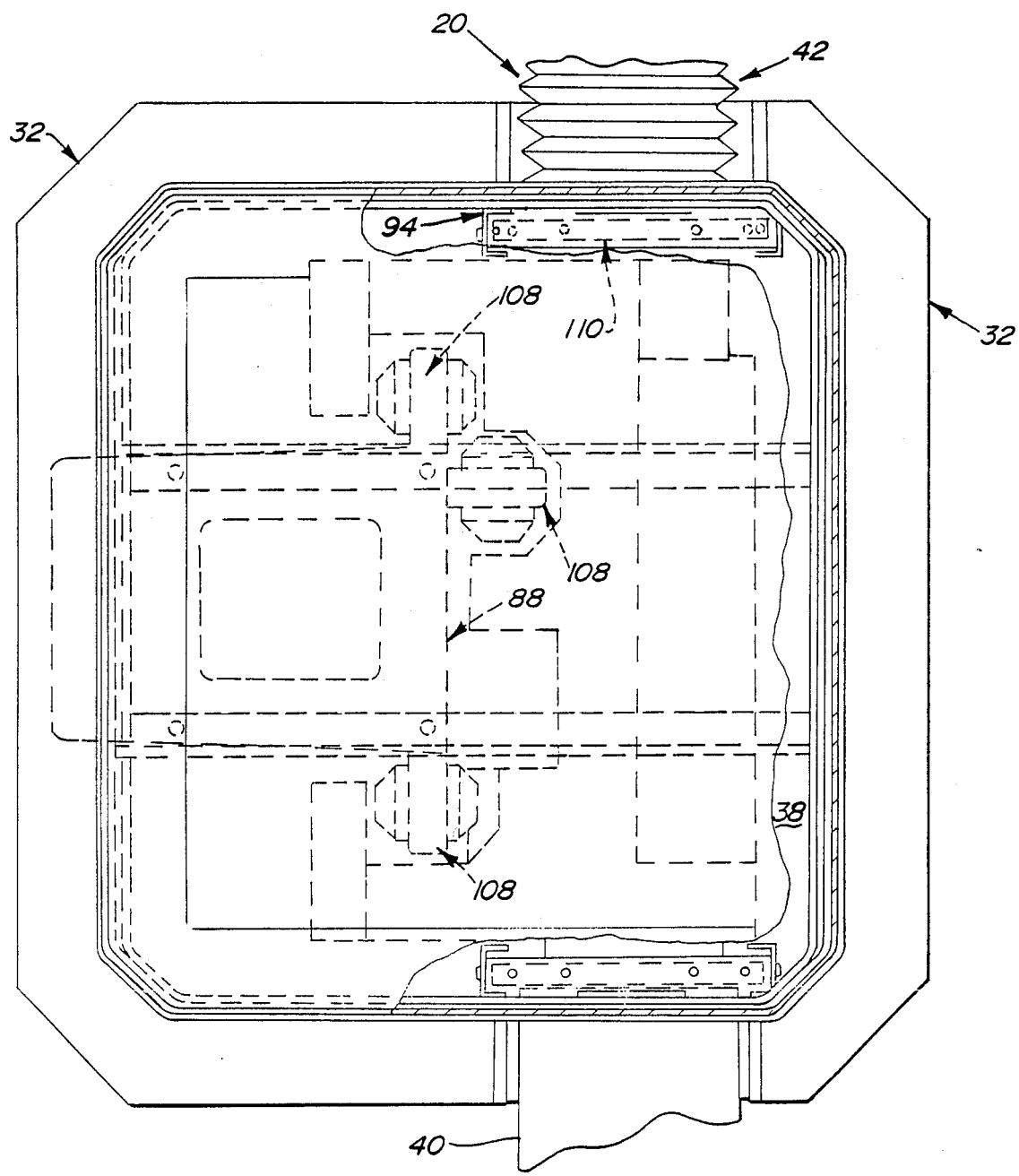
FIG. 6 is a plan view of the Y-axis column and cover system shown in FIG. 4 rotated 90° counterclockwise.

FIGS. 5 and 6 illustrate that the pleated curtains 36 (and 34) are received in oppositely facing U-shaped sections 118 of the channels 94, supported on tensioned wires 120 stretched between the top and bottom of Y column 16. The channels 94 define continuous surfaces within the gap 122 between the side covers 32.

The platform plates 86a, 86b have cut outs 124 to accommodate the Y-column 88 to pass through and be joined to the X-axis carriage 50.

We claim:

1. In combination with a coordinate measuring machine (10) of the type including a horizontal probe shaft assembly (20) supported on a machine base section (18) for movement along three orthogonal axes (X,Y,Z) by a X-axis carriage (50) guided along a set of spaced apart X-axis way members (24) fixed atop said base section (18); said X-axis carriage (50) disposed between said X-axis way members (24) and extending horizontally, a Y-axis carriage (106) guided along a set of ways (108) extending vertically along a Y axis column member (88) fixed to said X-axis carriage (50), said probe shaft assembly (20) supported on said Y-axis carriage (106) for vertical movement, the improvement comprising a cover system overlying said sets of ways (46, 108), said cover system comprising a pair of rigid X-axis cover members (26) each having a bottom fixed atop a respective X-axis member (24) and having a side extending upwardly therefrom and each cover member 26 also having a rigid flange portion (62) at the top of the side of each X-axis cover member (26), said flange portions (62) extending towards each other with a gap therebetween through which gap moves said Y-column member (88) and said X-axis carriage (50).

2. The coordinate measuring machine (10) according to claim 1 further including a pair of Y-axis cover members (32) supported by said Y-axis column member (88) and extending vertically to enclose either side of said Y-axis column with a vertical gap at the front and rear thereof through which said probe shaft assembly (20) passes in moving up and down said vertical ways (118).

3. The coordinate measuring machine (10) according to claim 2 further including a series of pleated covers (34, 36) disposed in said gap between said column side covers (32), one of said pleated covers (34) mounted above said Y-axis carriage (106) at the front and another one of said covers (34) at the rear, and a pleated cover (36) in said gap below said Y-axis carriage (106) at the front and rear thereof, said pleated covers (34, 36) each attached at one end to said Y-axis carriage (106) to be stretched or collapsed as said Y-axis carriage (106) moves up and down on said Y column (88).

4. The coordinate measuring machine (10) according to claim 3 further including quick release attachment means acting to releasably attach each of said pleated covers (34, 36) for expanding movement with movement of said axis carriage (106).

5. The coordinate measuring machine (10) according to claim 4 further including pairs of upright spaced apart side channel members (94) each fixed at their lower end to said platform (86), bracket (98) attached to the top of said Y column member (88), means (100) attaching each of said side channel members (94) attached at their upper ends to said bracket (98), each pair of said side channel members (94) each receiving a respective one of said pleated covers (34), (36) therebetween.

6. The coordinate measuring machine (10) according to claim 5 further including stretched wires (120) guiding collapsing and expanding movement of said pleated covers (34, 36).

7. The coordinate measuring machine (10) according to claim 2 wherein said side covers (32) taper in at their upper ends.

8. The coordinate measuring machine (10) according to claim 3 further including a horizontal platform (86) attached to the bottom of said Y column member (88) on which said side covers (32) are supported.

9. The coordinate measuring machine (10) according to claim 1 wherein said X-axis way members (24) have outer sides (35) sloping inwardly towards each other, and wherein each of said X-axis side cover members (26) are flush with the top of a respective X-axis way member (24) and have an outer side panel (58) sloping inwardly at the same angle.

10. The coordinate measuring machine (10) according to claim 9 wherein said base (18) and said way members (24) are constructed of granite and exposed to view beneath said X-axis cover members (26).

11. The coordinate measuring machine (10) according to claim 1 further including a covering belt (28) mounted in said gap between said flange portions (62) closing the space therebetween, said covering belt (28) attached at either end to a respective side of said X-axis carriage (50) and extending along portions of said gap on either side thereof, roller means (70, 72) on either end of said machine (10), said covering belt (28), passing down around either end of said rollers means (70, 72) and beneath said base section (18), to enable recirculation thereof as said X-axis carriage (50) traverses along said X axis.

12. The coordinate measuring machine (10) according to claim 11 further including a plastic channel (66) extending along said flange portion (62), said cover belt (28) riding atop said plastic channel (66).

13. The coordinate measuring machine (10) according to claim 1 wherein said cover system further includes a rigid end cap (30) fit over each end of said X-axis way members (24), covers (26) and adjacent portions of said base (18).

14. The coordinate measuring machine (10) according to claim 13 further including means for detachably mounting said end caps over said X-axis cover members comprising a Velcro (TM) attachment acting between each of said end caps (30), said X-axis cover members (26) and X-axis way members (24).

* * * * *